(No Model.)
M. CHASE.
JOINT FOR CONNECTING LEAD AND OTHER SOFT METAL PIPES.
No. 302,101. Patented July 15, 1884.
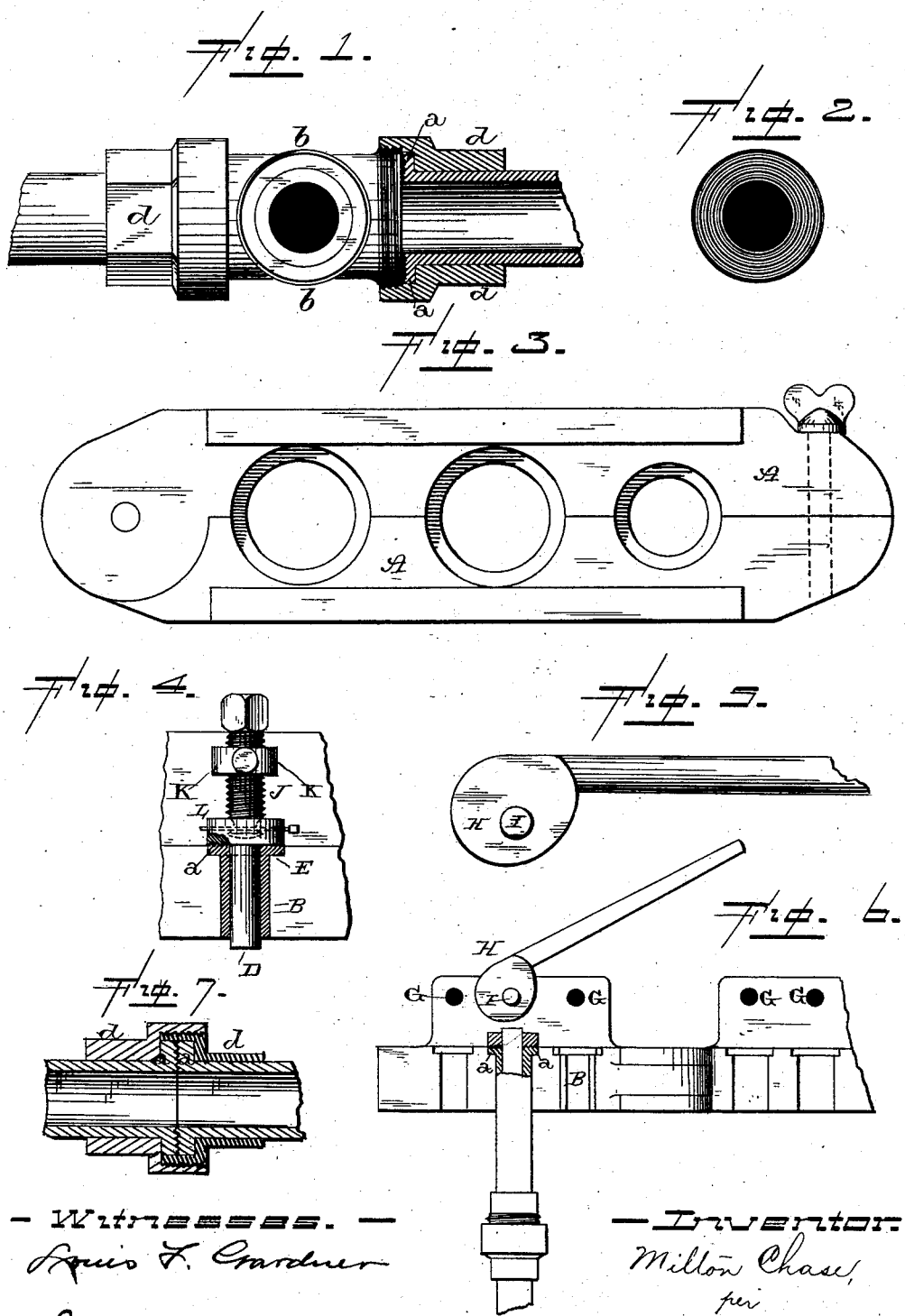

UNITED STATES PATENT OFFICE.

MILTON CHASE, OF HAVERHILL, MASSACHUSETTS.

JOINT FOR CONNECTING LEAD AND OTHER SOFT-METAL PIPES.

SPECIFICATION forming part of Letters Patent No. 302,101, dated July 15, 1884.

Application filed March 27, 1883. (No model.)

*To all whom it may concern:*

Be it known that I, MILTON CHASE, of Haverhill, in the county of Essex and State of Massachusetts, have invented certain new and useful Improvements in Joints for Connecting Lead and other Soft-Metal Pipes; and I do hereby declare the following to be a full, clear, and exact description of the invention, such as will enable others skilled in the art to which it pertains to make and use it, reference being had to the accompanying drawings, which form part of this specification.

My invention relates to an improvement in joints for connecting lead and other soft-metal pipes; and it consists, first, in the combination of a suitable coupling, made of two pieces, with the sections or section of a lead or other soft-metal pipe having a shoulder formed upon its or their ends, which shoulders are brought together so as to form a tight joint; second, in a lead or other soft-metal pipe having a shoulder formed upon its end, the face of the shoulder being made grooved or corrugated, so as to correspond with the adjoining section, which is similarly formed, and thus form a perfectly tight joint.

The object of my invention is to provide a means for coupling two lead pipes together or attaching a faucet or cork to the pipe or pipes at any desired point, either with or without the help of packing of any kind.

Figure 1 represents a vertical section of a pipe, showing two forms of coupling. Fig. 2 is an end view of a section of pipe, showing the grooves in the shoulder; and Figs. 3, 4, 5, 6, and 7 are detail views of the machine for forming the shoulder.

A represents two jaws of the machine in which the shoulder upon the end of the lead or other soft-metal pipe is formed, and which jaws are hinged or pivoted together, as shown, so that they can be opened for the purpose of admitting an end of the pipe, and then closed upon the pipe for the purpose of upsetting its end. In the inner sides of these two jaws will be formed any desired number of openings or grooves to receive the end of the pipe, and these openings will be preferably of different sizes, so that shoulders can be formed upon a number of different-sized pipes. Should it be desired only to form a single groove, then semicircular dies B of different sizes will be applied to the groove, and thus adapt this one groove to be used upon different sizes of pipe. After the pipe has been clamped in position between the two jaws, a plug, D, is forced into the end of the pipe, so as to prevent its shape from being spoiled while the end is being upset, and then the end of the pipe is upset or mashed over so as to fill the shouldered recess E, made at the top of the groove or in the top of the die. This end may be upset or mashed down in any suitable manner; but it is preferable to have a suitable means for doing this, so as to form a neat and perfect shoulder. The end of the pipe is mashed or forced down until the upset portion perfectly fills the shouldered recess at the top of the groove, and then when the pipe is removed it is ready to be applied directly to the coupling. In order to upset this end in a neat and expeditious manner, a series of holes, G, are formed in the upper edge of the die in which the upsetting-lever can be journaled, there being two holes for each groove or die that is formed in the inner sides of the jaw. Either a lever having its inner end made cam-shaped, as shown at H, and provided with journals I, or a screw, J, which is journaled in a suitable bearing, K, and which has a suitable die, L, swiveled upon its lower end, may be used. To the lower side of this die may be attached a wooden plug, which is to be inserted into the end of the pipe for the purpose of preserving its shape, and the plug and the die may be forced downward at the same time. Either the lever or the screw can be transferred from one side of the openings to the other, according to which one of the grooves in the die the end of the pipe is fastened.

I do not limit myself to any particular form of device for upsetting the end of the pipe, for this may be varied at will without departing from the spirit of my invention.

After the shoulder *a* has been formed upon the end of the pipe, it is ready to be used at once in connection either with a coupling formed of two parts or a T-faucet joint, *b*, as shown. Where the end of the pipe with which it is desired to couple has been cut, it is necessary to form a flange, *a*, upon its end, as shown in Fig. 1. Before this flange is formed, it is necessary to slip a coupling, *d*, over the end of the pipe, and then the machine for forming the flange is applied to the end of the pipe, and the flange *a* is formed. After the flange *a* has been formed, the coupling *d* is moved up against the flange, as shown in Figs. 1 and 7, when the pipe can be coupled to another one provided with a coupling which corresponds to *d*. When the two parts of the coupling are screwed together, a tight and perfect joint is formed.

As the use of hot and cold water in the pipes causes the joint to expand and contract, in order to form a perfectly tight joint, the dies which are used in upsetting the ends of the pipe are made corrugated, as shown, and then sharp corrugations cut into the end of the lead or other soft metal, so as to corrugate them in a similar manner. When the two ends of the pipe are brought together, these corrugated portions interlock with each other and form a tight joint, which will not leak under any ordinary expansion or contraction. If a washer of any suitable material is placed between them, then the joint cannot be made to leak. Where a T-joint, *b*, for the application of a faucet is to be used, two female couplings, *d*, will be slipped over the ends of the cut pipe, and then the T-joint *b*, having male threads, will be placed in between them and the female couplings screwed tightly upon it. This T-joint may have either two or three couplings connected thereto, as may be desired. The great advantage of thus forming shoulders upon the pipe consists in the ease with which the ends of two pipes can be securely fastened together without the help of a packing of any kind. This is especially useful to plumbers, where they seldom ever have more than one end of the pipe to work upon.

No claim is here made to the machine and process of forming the flange on the pipe, for these will be made the subject of a separate application.

Having thus described my invention, I claim—

1. The combination of the couplings *d*, which are passed over the ends of the pipes, with the lead or other soft-metal pipes having the flanges *a* formed on their ends after the couplings have been placed in position, substantially as shown.

2. The combination, with a suitable coupling, of two portions of lead or other soft-metal pipes, each of which has a shoulder, *a*, formed upon its end, and each shoulder having a series of corrugations or grooves formed in its outer side or face, so that when the ends of the pipes are brought together the corrugations will interlock, substantially as specified.

In testimony whereof I affix my signature in presence of two witnesses.

MILTON CHASE.

Witnesses:
WILLIAM JEFFERS,
GEORGE J. DEAN.